July 7, 1959 N. B. MURPHY 2,894,230

SIGNAL TRANSMITTER WITH MANUAL CONTROL COMPRISING INDUCTIVE DEVICE

Filed Feb. 18, 1955 2 Sheets-Sheet 1

INVENTOR
NORMAN B. MURPHY
BY
Oscar B Brumback
ATTORNEY

July 7, 1959

N. B. MURPHY 2,894,230

SIGNAL TRANSMITTER WITH MANUAL CONTROL COMPRISING INDUCTIVE DEVICE

Filed Feb. 18, 1955

2 Sheets-Sheet 2

INVENTOR
NORMAN B. MURPHY
BY
Oscar B Brumback
ATTORNEY

United States Patent Office 2,894,230

Patented July 7, 1959

2,894,230

SIGNAL TRANSMITTER WITH MANUAL CONTROL COMPRISING INDUCTIVE DEVICE

Norman B. Murphy, Tenafly, N.J., assignor to Bendix Aviation Corporation, Teterboro, N.J., a corporation of Delaware Application February 18, 1955, Serial No. 489,238

5 Claims. (Cl. 336—30)

This invention relates generally to signal developing devices and more particularly to signal developing devices for control systems.

Signal developing devices generally comprise two relatively movable elements, the movement of one from a normal position relative to the other developing a corresponding signal. In a control system, one of the two elements of the signal generator is positioned by a reference device and the normal position of the two elements usually corresponds to the normal position of a reference sensor or a controlled or controlling unit.

The signal devices of a control system, such as an automatic pilot system for an aircraft, are frequently placed in remote and inaccessible locations. Under these conditions, it is very difficult to adjust the relative position of the two elements so that the normal position of the signal generator corresponds to the normal position of the reference sensor or unit.

An object of the present invention, therefore, is to provide a novel signal generator having a readily settable null or normal position.

Another object of the invention is to provide a novel signal generator having a means for manually connecting and disconnecting the signal generator from its actuator whereby the signal generator may be set at a null position regardless of the actuator position.

The present invention contemplates a novel arrangement of a two part signal generator having one part relatively fixed and the second part adapted to be connected to a displacing means to be displaced relative to the one part to develop a signal and which is provided with a manually operable device for engaging and disengaging the displacing means and a centering device so that the two signal generators may be placed at an initial centered position for any position of the displacing means.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for the purpose of illustration and description only, and are not intended as a definition of the limits of the invention.

In the drawings where like parts are marked alike:

Figures 1, 4:
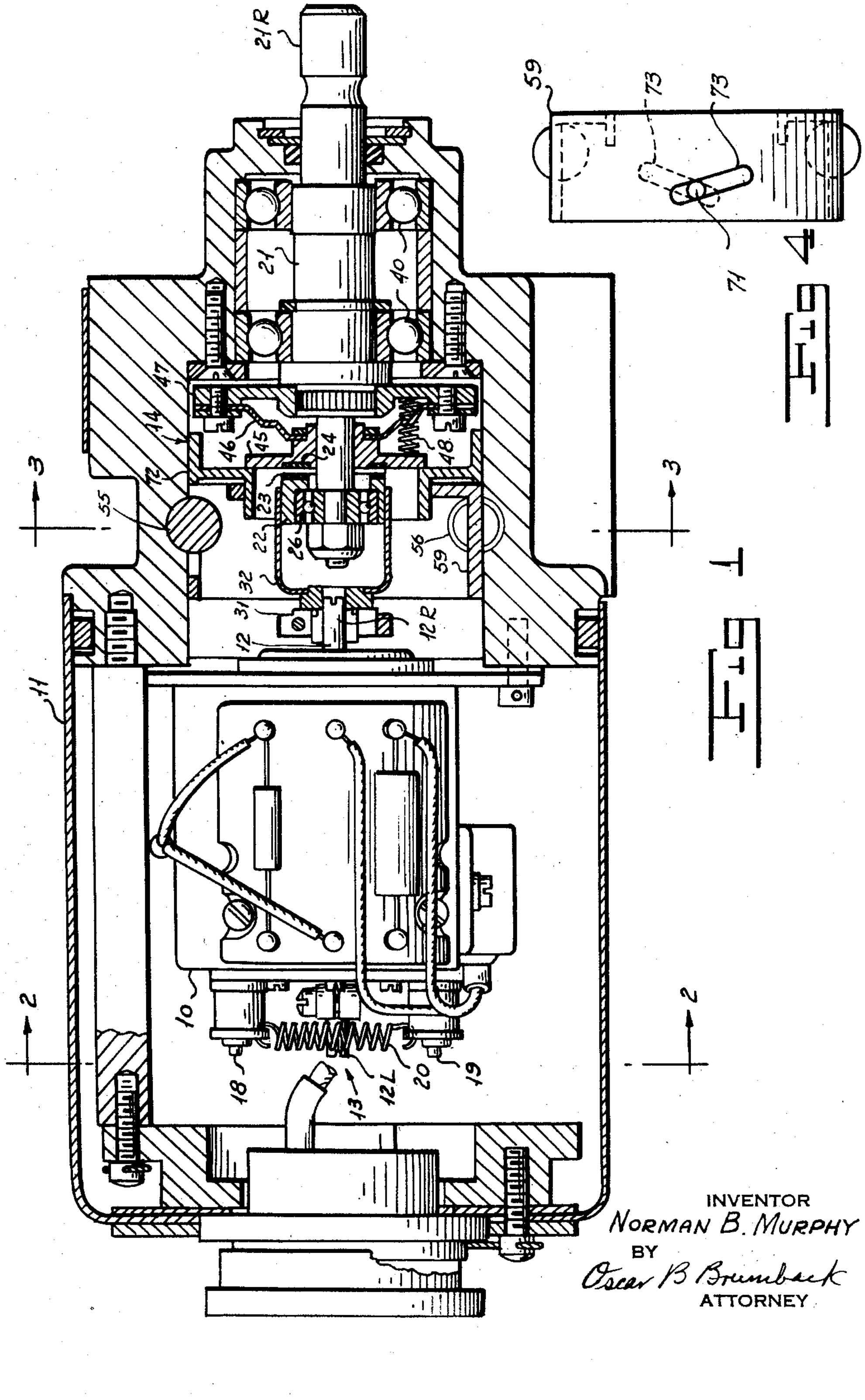
Figure 1 is a sectional elevational view of the novel signal generator of the present invention.
Figure 4 is a detail drawing of the control ring of Figure 1.
Figure 3:
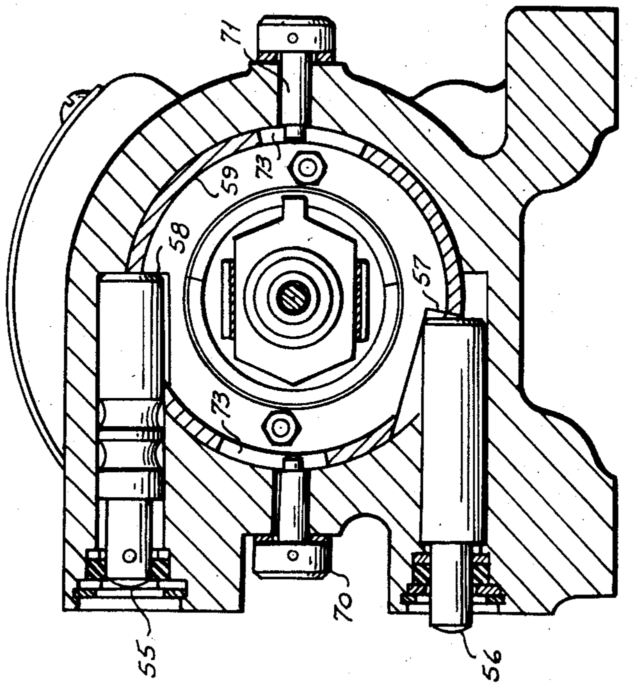
Figure 3 is a sectional view taken along section 3—3 of Figure 1.

Turning now to Figure 1, a suitable housing 11 encloses a conventional inductive device 10 having stator and rotor windings (not shown). In a well known manner, the stator winding is relatively fixed with the housing and the rotor winding is mounted on a shaft 12 for rotation within the stator, the portions of shaft 12 projecting beyond inductive device 10 being generally designated 12L and 12R. Portion 12L coacts with a centering arrangement 13 and portion 12R coacts with a driving arrangement 14.

Figure 2:
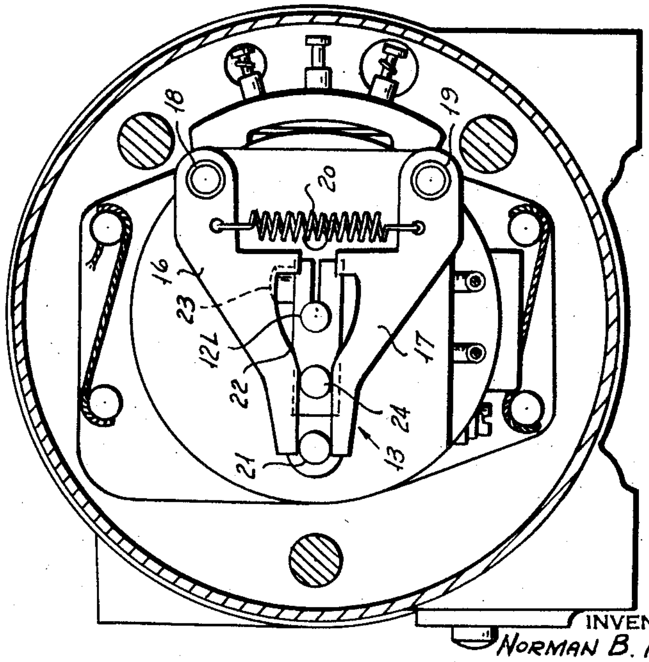
Figure 2 is a view along section 2—2 of Figure 1.

The centering arrangement 13, Figure 2, comprises a pair of levers 16 and 17 which are pivotally mounted on pins 18 and 19 projecting from the stator housing and are urged by a spring 20 against a projection 21 that also extends from the housing. A bracket 22 fixed to rotor shaft 12L by suitable means, such as screw 23, has a pin 24 that projects between levers 16 and 17. Pin 24 urges lever 16 outwardly upon a clockwise rotation of shaft 12L. Since the movement of lever 17 is prevented by pin 21, spring 20 is stressed; and the tension of spring 20 returns pin 24 to center position as soon as the turning torque of shaft 12 is released. Similarly, a counter-clockwise turning of shaft 12 urges lever 17 outwardly, and the tension of spring 20 returns shaft 12 to a center position when the torque is released. Thus, the rotor and stator of inductive device 10 are normally maintained in a centered or null position.

The driving arrangement 14, Figure 1, for portion 12R of rotor shaft 12 comprises generally a drive shaft 21, a driven shaft 22, and a clutch having faces 23 and 24 for drivably connecting the two shafts. Driven shaft 22 is journaled for rotation on drive shaft 21 by bearings 26 and is connected to the portion 12R of the rotor shaft by a bracket 31 fixed to shaft 12R and a spring 32. This spring, being fixed to the bracket and engaging shaft 22, provides a spring coupling between the rotor shaft 12 and the driven shaft 22 to prevent the effect of thrusts or radial loads which may be applied to driven shaft from being applied to rotor shaft. Drive shaft 21 has an end portion 21R adapted to be connected to a suitable drive means and is journaled for rotation within housing 11 by means of bearing 40. One clutch face 23 is integral with driven shaft 22 and the other face 24 is integral with a member 45 which is slidable and rotatable on shaft 21. A diaphragm 46 which is fixed to both member 45 and to a flange 47 constrains member 45 to rotate with shaft 21, flange 47 being integral with shaft 21. Springs, such as spring 48, urge member 45 to the left to engage clutch faces 23 and 24. The engagement and disengagement of clutch faces 23 and 24, however, is controlled by the operation of a pair of push rods 55 and 56.

Push rods 55 and 56 engage with notches 57 and 58 in a slotting ring 59 that bears against inside bore of housing 11. Notches 57 and 58 in the ring are so arranged that when one button 55 or 56 is pressed into the housing, the opposite button is forced to project from the housing. A conventional spring urged detent arrangement (not shown) may be provided to hold the button shafts in an engaged or disengaged position.

Ring 59 also engages with two pins 70 and 71 which are fixed to the housing 11 and, as shown more clearly in Figure 4, extend through helix slots 73 in the ring. Thus, rotation of ring 59 causes the ring to slide to the left and right in the housing. A counter-clockwise rotation causes the ring to slide longitudinally to the left relative to housing 11; and springs 48, urging member 45 and a sleeve 72 to the left, engage clutch faces 23 and 24. A clockwise rotation of ring 59, on the other hand, moves the ring to the right; this moves sleeve 72 to the right which, in turn, moves member 45 to the right, compressing springs 48, and disengages the clutch faces.

In the operation of the novel signal generator of the present invention, the signal generator is mounted on a suitable frame; portion 21R of shaft 21 suitably connected to a gear train or other drive means for the shaft; and push rod 55 is depressed. Should the installation place the signal generator in a relatively inaccessible location, a rod or other suitable extensible means may be used to depress rod 55. Depressing rod 55 drives ring 59 angularly to the position shown and also longitudinally to move sleeve 72 to the right. Sleeve 72, engaging member 45, forces member 45 to the right, compressing springs 48 and disengaging clutch face 24 from clutch face 23. This disengagement of the clutch faces releases any torque exerted on the rotor shaft and the action of spring 20 on levers 16 and 17 urges pin 24 to a center position to place signal generator 10 in a no signal condition. The control element may then be driven to a normal position.

Turning the control element turns the driving shaft 21 at the same time; clutch faces 23 and 24, however, are disengaged and the signal generator 10 remains at a null position. After the control element is in the desired position, button 56 is depressed. The action of the button shaft on recesses 57 angularly displaces ring 59 in a counter-clockwise direction and drives pin 55 outwardly from the housing 11. The angular displacement of ring 59, due to the coaction of pins 71 and 72 with the helical slots 73, moves ring 49 to the left; and spring 48 forces clutch faces 23 and 24 into engagement. Thereafter, any displacement of the control member from this initial position is transmitted through the action of clutch faces 23 and 24 to displace rotor shaft 12 and the rotor of inductive device 10 relative to the stator to develop a corresponding signal for the control system.

The foregoing has described a novel signal generator which is readily set manually at a null position for changes in the normal position of a control element.

Although only one embodiment of the invention has been illustrated and described in detail, it is to be expressly understood that invention is not limited thereto. Various changes can be made in the design and arrangement of the parts without departing from the spirit and scope of the invention as will now be understood by those skilled in the art.

What is claimed:

1. A signal developing device comprising an inductive device having a rotor and a stator relatively rotatable from a reference position to develop an output signal, a housing for said inductive device, said stator being fixed with said housing and said rotor being rotatable relative thereto, a control shaft in said housing for rotatably adjusting said rotor relative to said stator to vary said output signal, clutch means for connecting and disconnecting said rotor and control shaft, a pair of rods movable into and out from said housing, axially movable rotatable means for operably connecting one of said rods and said clutch for engaging said shaft and said rotor, and said axially movable rotatable means for operably connecting said other rod and said clutch for disengaging said rotor and said shaft, and means for biasing said rotor to said reference position relative to said stator upon such disengagement of said rotor and control shaft whereupon the control shaft may be freely angularly adjusted relative to the rotor and stator in said reference position.

2. In a signal developing device operable from a reference position to develop a corresponding signal; the combination comprising a freely movable control shaft adapted to operate said signal device, connecting and disconnecting means for connecting and disconnecting said shaft and signal device, a pair of operator-operative push buttons alternately movable for mechanically operating said last named means, one button movable in one sense for operating said last named means to connect said shaft and signal developing means, and said other button movable in one sense for operating said last named means to disconnect said shaft and signal device, and means for maintaining said signal device in said reference position upon the disconnection of said shaft and signal device whereupon the control shaft may be freely adjusted relative to the reference position of the signal developing device.

3. A signal developing device comprising two parts relatively movable from a normal position to develop an output signal, a control member adapted to be freely moved, a clutch having one face fixed to one of said parts and the other face fixed to said member, a rotatable ring operably connected with one of said faces, means effective upon rotation of said ring in one sense to cause axial movement of said ring in one direction to engage said faces so that said control member and said part are movable together and said means being effective upon rotation of said ring in an opposite sense to cause axial movement of said ring in the opposite direction to disengage said faces so that said part and said member are relatively movable whereupon the position of the control member may be adjusted relative to the normal position of said parts, operator-operative means to effect selective rotation of said ring in said first and second-mentioned senses, and means for maintaining said signal developing parts in the normal position upon disengagement of said clutch faces.

4. A signal developing device comprising an inductive device having a rotor and a stator relatively rotatable from a reference position to develop an output signal, a housing for said inductive device, said stator being fixed with said housing and said rotor being rotatable relative thereto, a control shaft in said housing for rotatably adjusting said rotor relative to said stator to vary said output signal, clutch means for connecting and disconnecting said rotor and shaft, a pair of operator-operative rods alternately movable into and out from said housing, an axially movable rotatable ring means, means operably connecting one of said rods to said ring means to effect rotation and axial movement thereof in one sense to cause said clutch to operatively engage said control shaft and said rotor upon movement of said one rod into said housing, means operably connecting said other rod to said ring means to effect rotation and axial movement thereof in an opposite sense to cause said clutch to disengage said rotor and said shaft upon movement of said other rod into said housing whereupon the position of the control shaft may be freely adjusted relative to the reference position of the rotor and stator of said inductive device, and spring means for maintaining said rotor and stator in the reference position when said clutch disengages said rotor and shaft.

5. The combination comprising a housing, a drive shaft and a driven shaft, means rotatably mounting said shafts in said housing, clutch means for connecting and disconnecting said drive shaft and said driven shaft, a pair of operator-operative push rods alternately movable into and out from said housing, an axially movable rotatable ring means, means operably connecting one of said rods to said ring means to effect rotation and axial movement thereof in one sense to cause said clutch to operatively engage said drive shaft and said driven shaft upon movement of said one push rod into said housing, means operably connecting said other rod to said ring means to effect rotation and axial movement thereof in an opposite sense to cause said clutch to disengage said drive shaft and said driven shaft upon movement of said other push rod into said housing, and spring means for biasing said driven shaft in opposite senses so as to maintain the driven shaft in a predetermined reference position upon said clutch means disengaging said drive shaft and said driven shaft, whereupon said drive shaft may be freely rotatably adjusted relative to the driven shaft as maintained in said reference position by said spring means.

References Cited in the file of this patent

UNITED STATES PATENTS

| | | |
|---|---|---|
| 2,427,621 | Peterson | Sept. 16, 1947 |
| 2,457,210 | Coffey | Dec. 28, 1948 |
| 2,490,044 | Garbarini et al. | Dec. 6, 1949 |
| 2,512,902 | Rossire | June 27, 1950 |
| 2,572,272 | McLagan | Oct. 23, 1951 |
| 2,625,050 | Kwasniewski | Jan. 18, 1953 |
| 2,644,427 | Sedgefield et al. | July 7, 1953 |

FOREIGN PATENTS

| | | |
|---|---|---|
| 244,698 | Great Britain | June 24, 1926 |